United States Patent [19]

Welscher et al.

[11] Patent Number: 5,436,419
[45] Date of Patent: Jul. 25, 1995

[54] NEUTRAL START SWITCH AND BACKUP ALARM SWITCH, AND METHOD OF ASSEMBLING THE SAME FOR A MANUAL DISPLACEMENT CONTROL FOR A HYDROSTATIC TRANSMISSION

[75] Inventors: William L. Welscher, Ankeny; William J. Akins, Nevada, both of Iowa

[73] Assignee: Sauer Inc., Ames, Iowa

[21] Appl. No.: 48,748

[22] Filed: Apr. 16, 1993

[51] Int. Cl.$^6$ ............................................. H01H 9/06
[52] U.S. Cl. ............................. 200/61.88; 200/61.85
[58] Field of Search ............... 200/61.28, 61.85, 61.86, 200/61.87, 61.88

[56] References Cited

U.S. PATENT DOCUMENTS

| | | | |
|---|---|---|---|
| 2,427,453 | 9/1947 | Hadley | 200/52 |
| 3,423,549 | 1/1969 | Sondei | 200/61.88 |
| 3,613,482 | 10/1971 | Benson et al. | 74/850 |
| 3,811,020 | 5/1974 | Johnson et al. | 200/61.88 |
| 3,915,022 | 10/1975 | Walton | 74/99 |
| 3,919,510 | 11/1975 | Barnes | 200/61.98 |
| 4,007,757 | 2/1977 | Emmert | 137/315 |
| 4,027,555 | 6/1977 | Rauchle et al. | 74/878 |
| 4,267,804 | 5/1981 | Rypka | 123/179 K |
| 4,534,739 | 8/1985 | Slattery | 440/84 |
| 4,884,145 | 11/1989 | Kave et al. | 358/229 |
| 4,895,053 | 1/1990 | Moffitt | 74/850 |

*Primary Examiner*—A. D. Pellinen
*Assistant Examiner*—Michael A. Friedhofer
*Attorney, Agent, or Firm*—Zarley, McKee, Thomte, Voorhees & Sease

[57] ABSTRACT

A manual control for hydrostatic transmission has a body member having a first cavity exposed to hydraulic pressure into which a manually operated input shaft extends. The body member has a second cavity with a passage intersecting the first cavity and a shaft and O-ring seal in therebetween. The second cavity is free of hydraulic pressure and has an electrical switch extending thereinto. Switch has an actuating member cable of electrically and individually actuating at least two separate circuits. Cam are operatively connected to the input shaft and positioned to contact the electrical switch such that a first of the cam caused by the input shaft will open one of the circuits and a second increment of movement of the cam will close the other of the circuits. Switches normally in a neutral and closed position with respect to one circuit. The method of assembling the aforementioned structure involves providing a torsional spring to interconnect the body member, the cam, and the shaft to normally maintain the switch in a neutral position wherein one circuit is closed and the other is opened. The cam plate of the cam is released from spring connection to the shaft. The cam plate is devised so that it will maintain the switch in its neutral position. The cam plate is then fixed in a position with respect to the input shaft and the switch.

18 Claims, 7 Drawing Sheets

NEUTRAL START SWITCH AND BACKUP ALARM SWITCH, AND METHOD OF ASSEMBLING THE SAME FOR A MANUAL DISPLACEMENT CONTROL FOR A HYDROSTATIC TRANSMISSION

BACKGROUND OF THE INVENTION

The operator's station of a vehicle or machine having a hydrostatic transmission has a manually actuated lever. This lever is connected to a manual displacement control (MDC) input handle by mechanical means such as a push/pull cable or linkage means. If this mechanical means becomes disconnected, it is important that the MDC automatically cause the pump in the hydrostatic transmission to return to neutral to stop the vehicle or other load that is driven by the pump.

The MDC typically will have a neutral start switch (NSS), but not a backup alarm switch (BAS). The NSS is sensitive to case pressure. When case pressure is high, such as when the oil is cold, the pressure on the pin can push the pin and actuate the switch. A higher spring force can be used in the switch to counteract high case pressure but this creates a higher friction, and worsens the "stick/slip" characteristic caused by pushing the pin out of the cam detent. These higher forces are undesirable. When a machine operator is trying to very carefully move the input handle (such as inching a vehicle up to an attachment) he will have difficulty if a large force is required to lift the pin out of the detent.

Further, existing MDC's are difficult to adjust on the production assembly line and in the field. Some manual displacement controls are spring centered to neutral via springs on a valve spool in the control. However, many tolerances exist in the linkage between the valve spool and the input shaft. Thus, the switch mechanism must be adjusted to ensure the switch will be open before the valve spool begins to port and put the pump into stroke, but yet provide some reasonable angular range within which the switch is closed. Several complex adjustments are normally required to set the switch to actuate at the correct positions of the input handle. The typical adjustments are external in nature, which makes it difficult to seal the switch and assembly from the external environment. Moisture can seep by the threaded adjustments and corrode the switch to impair its proper functioning.

It is therefore a principal object of this invention to provide a manual displacement control for a hydrostatic transmission that can be removed from the pump of the transmission without having to readjust the neutral start switch assembly.

A further object of this invention is to provide a neutral start switch assembly on a manual displacement control for a hydrostatic transmission wherein a switch can be replaced without having to readjust the neutral switch assembly.

A still further object of this invention is to provide a manual displacement control for a hydrostatic transmission wherein internal hydraulic "case" pressure will not activate the electrical switches of the control.

A still further object of this invention is to provide a manual displacement control for a hydrostatic transmission having a NSS and BAS that can be operated with a single cam.

A still further object of this invention is to provide a manual displacement control for a hydrostatic transmission which is easy to assemble.

These and other objects will be apparent to those skilled in the art.

SUMMARY OF THE INVENTION

The manual control for a hydrostatic transmission of this invention has a body member having a cavity into which a manually operated shaft member extends. An electrical switch is on the body member and has an actuating member capable of electrically and individually activating one or more electrical circuits. A cam is operatively connected to the shaft and is in contact with the electrical switch whereupon a first increment of movement of the cam by the shaft will open one of the circuits, and a second increment of movement of the cam will close the other of the circuits. The switch is normally in a neutral and closed position.

The method of assembling the aforementioned structure involves providing a yieldable retention element to interconnect the body and the shaft to normally maintain the switch in a neutral position wherein the NSS circuit is closed. The cam is released from spring connection to the shaft. The cam is adjusted so that it will maintain the switch in its neutral position. The cam is then fixed in position with respect to the shaft.

DESCRIPTION OF THE PREFERRED EMBODIMENT

Figure 1:
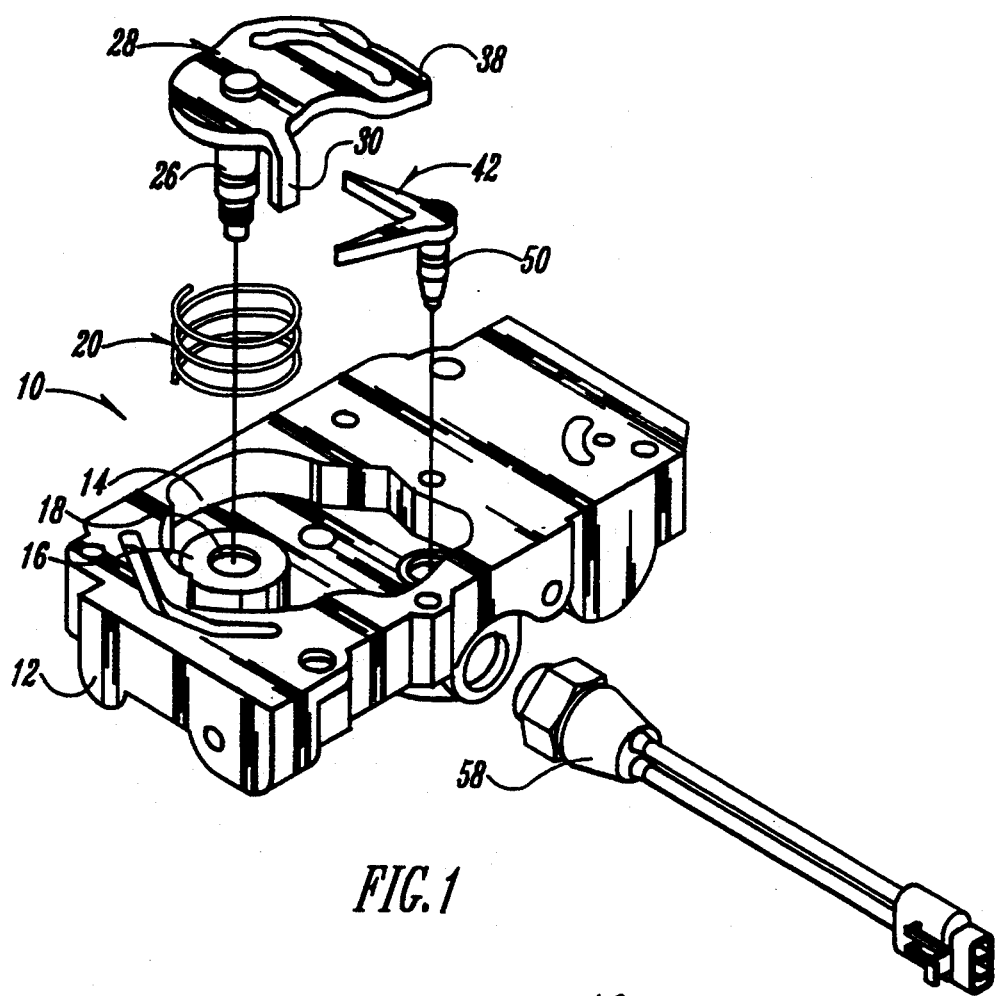
FIG. 1 is an exploded perspective view of the control assembly of this invention as viewed from the bottom thereof.
Figure 4:
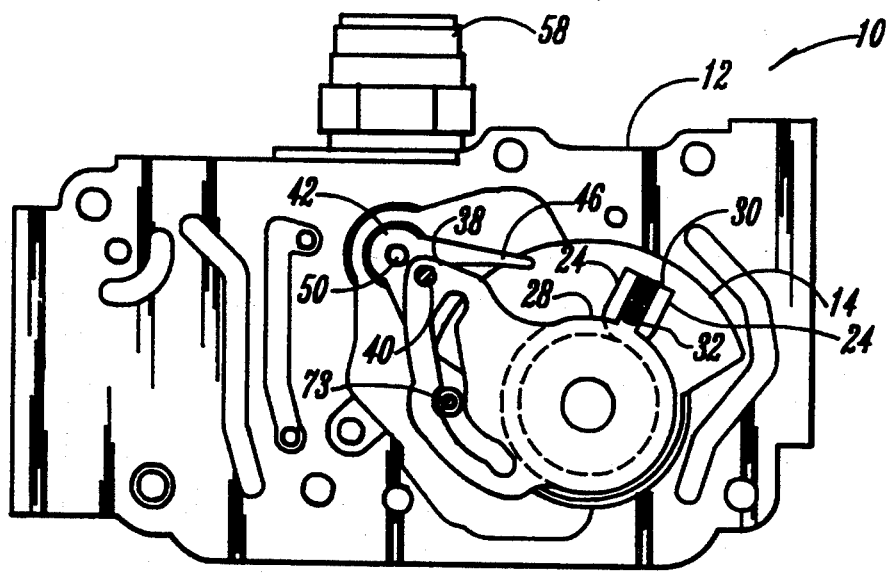
FIG. 4 is a partial sectional view of the assembled components of FIG. 1 as viewed from the bottom thereof.
Figure 5:
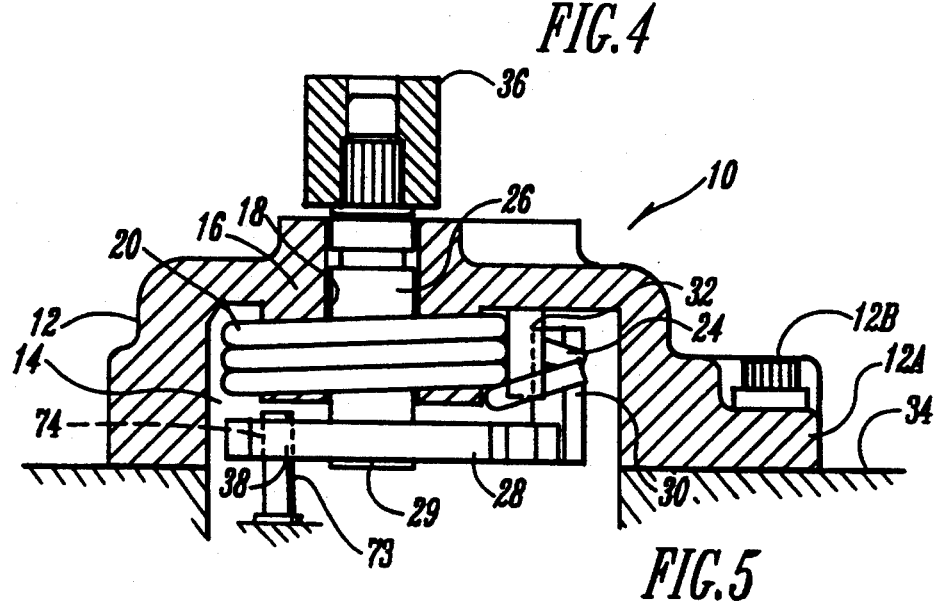
FIG. 5 is a sectional view through the cover of the device taken on line 5—5 of FIG. 2.
Figure 6:
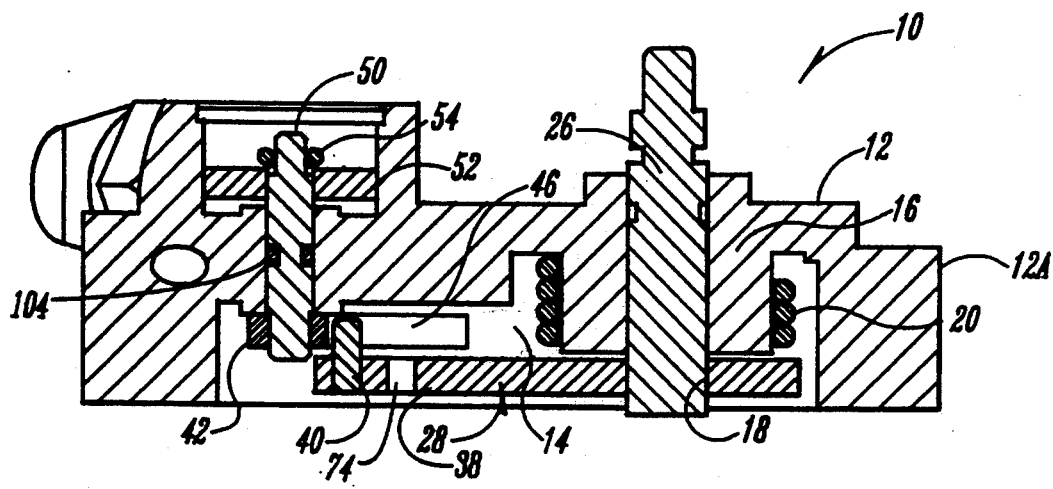
FIG. 6 is a sectional view taken on line 6—6 of FIG. 4.

The control assembly 10 is comprised of cover member 12 (FIG. 1) which has a center cavity 14 and a protruding cylindrical boss 16. A center bore 18 extends through boss 16, and torsion spring 20 extends around the outer surface of the boss. Torsion spring 20 is comprised of spring body 22 with opposite ends 24. (FIG. 5) An input shaft 26 extends through bore 18 of boss 16, and has an interior end 29 which is rigidly secured to plate 28. An upwardly extending tang 30 is secured to plate 28. Tang 30 extends upwardly between the parallel and radially extending ends 24 of torsion spring 20 as best seen in FIGS. 4 and 5. A downwardly extending pin 32 is secured by its upper end to cover member 12 and also extends between the spaced ends 24 of torsion spring 20 (FIG. 4). Body 12 (FIGS. 5 and 6) is secured to pump body 34 (FIG. 6A) by bolts 12B (FIG. 5). A handle 36 for manual operation of the control assembly is secured to the exterior end of input shaft 26.

Figure 8:
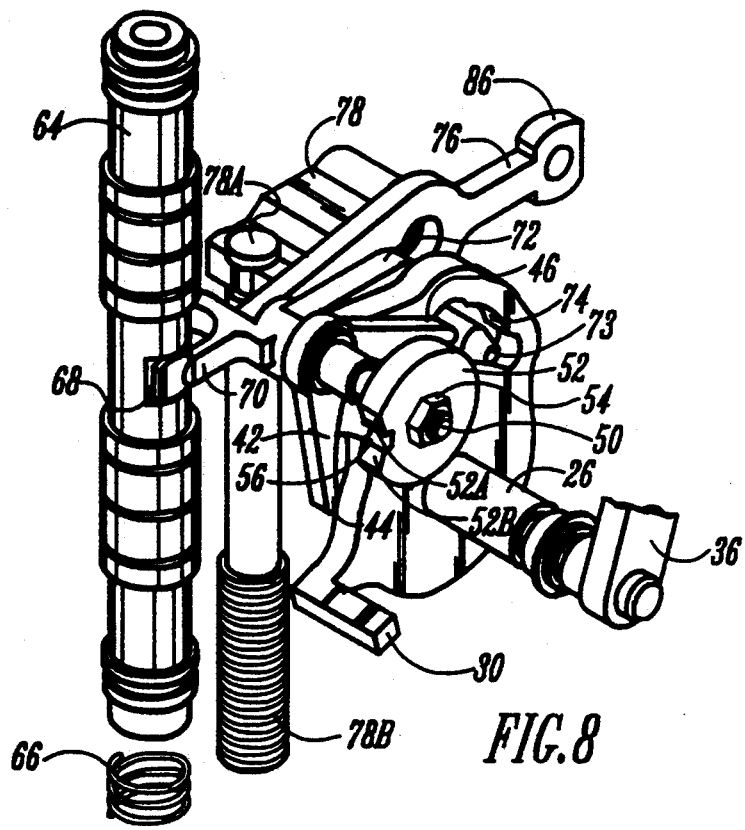
FIG. 8 is an enlarged scale perspective view of the various linkage components of the control assembly as related to the valve spool of the device.

Plate 28 includes an arm 38 from which extends a pin 40. (FIGS. 4 and 6) Pin 40 is positioned adjacent switch rotor 42 which has a pair of angularly disposed cam arms 44 and 46 with an arcuate detent 48 therebetween. Switch rotor 42 is rigidly secured to upwardly extending shaft 50 (FIG. 6) which has cam plate 52 secured to its upper end by nut 54. Cam plate 52 has at least one detent portion 56 (FIG. 8).

Figure 7:
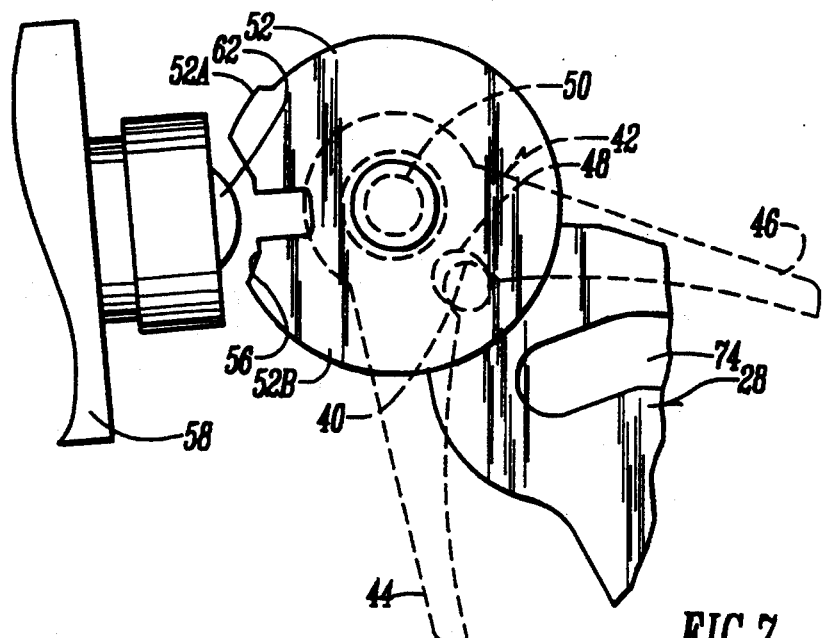
FIG. 7 is an enlarged scale plan view of the electrical switch, cam plate, and switch rotor showing the switch in a neutral position.

A backup alarm switch and/or a neutral start switch 58 are secured to member 12. Switch 58 is comprised of a switch body 60 in which is mounted a spring loaded contact ball 62 (FIG. 7). The dual function switch 58 will break contact with the neutral start circuit if the ball 62 is depressed into the switch body by cam plate 52 an increment of 0.01–0.025 inches; and will make contact with the backup alarm circuit if the ball travel is 0.04–0.06 inches. The switch 58 is of conventional construction and does not of itself constitute the invention herein.

Figure 3:
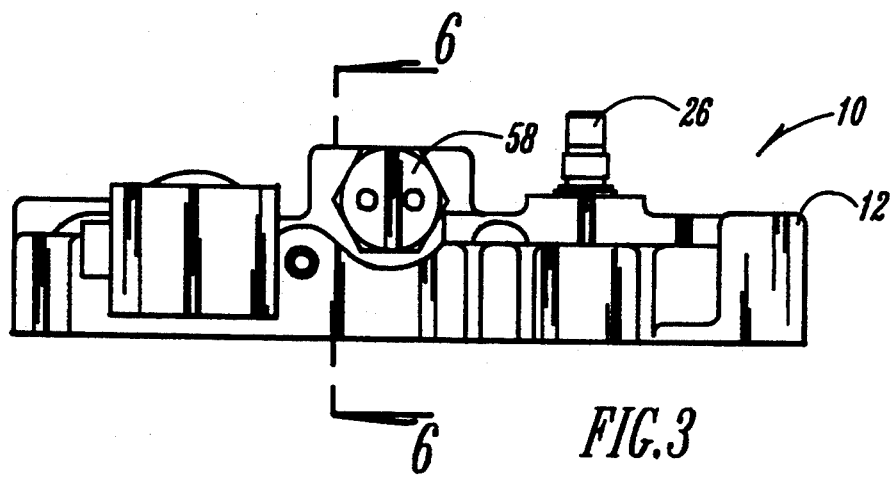
FIG. 3 is a reduced scale elevational view thereof as seen from the top of FIG. 2.

FIG. 3 shows an elevation view of a portion of the control assembly 10, including the cover member 12 (detached from the pump body), input shaft 26 (with the handle 36 removed), and switch 58 (with the wires removed).

Figure 6A:
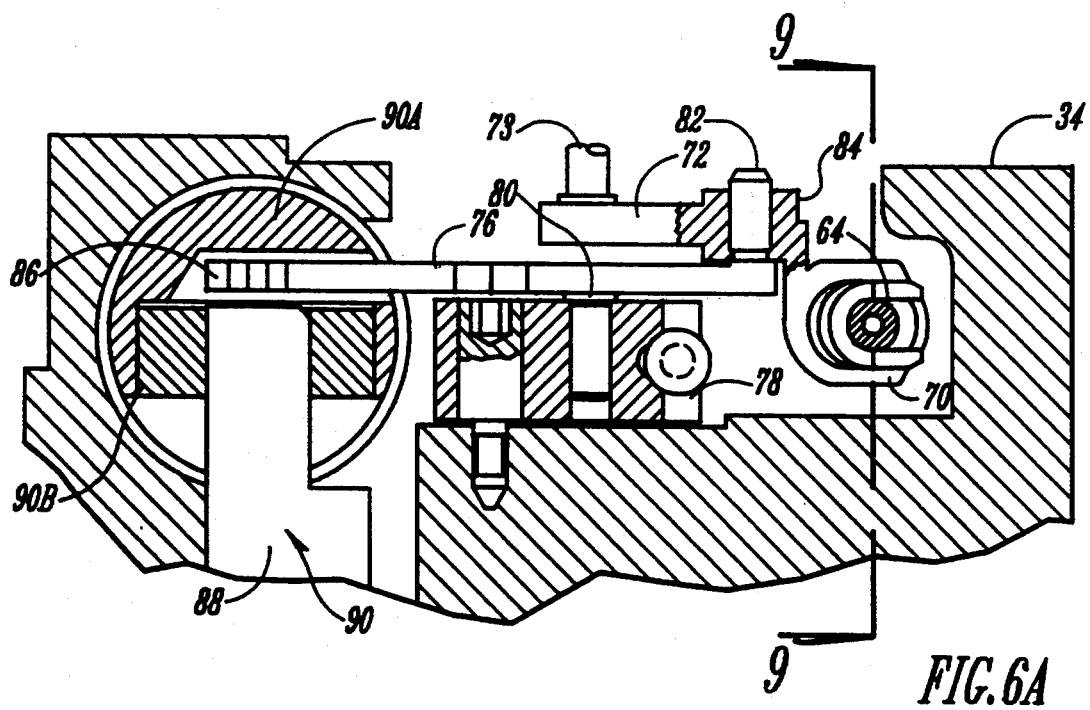
FIG. 6A is a sectional view of the pump body shown at a larger scale than that of FIG. 6. The structure of FIG. 6A is taken at right angles to the view of FIG. 6, and is secured to the bottom of the FIG. 6 structure.
Figure 9:
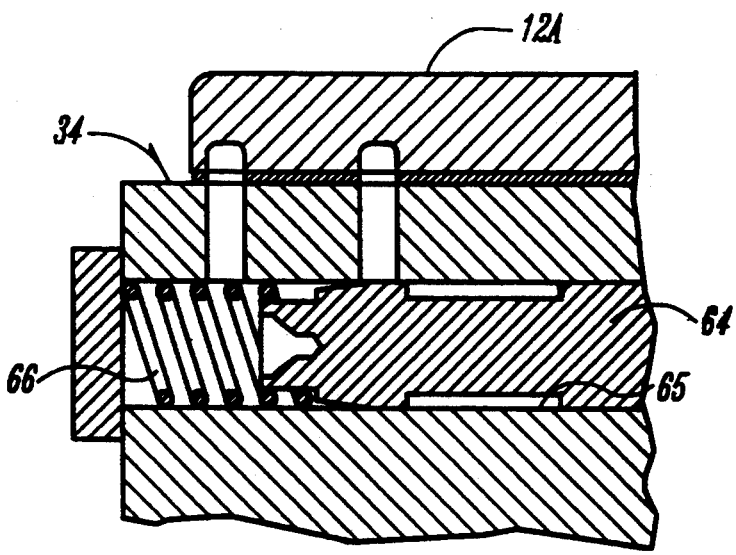
FIG. 9 is a sectional view taken on line 9—9 of FIG. 6A and shows the spring at one end of the valve spool.

Conventional valve spool 64 is slidably mounted in bore 65 of body member 34 (FIGS. 6A, 8 and 9), and is spring loaded at one end by spring 66 which bears against the valve spool 64 and the closed end of bore 65 (FIG. 9). Planar surfaces 68 on valve spool 64 are engaged by U-shaped connector 70 which is secured to link member 72 (FIG. 8). Link 72 has a pin 73 that extends through cam slot 74 of plate 28 (FIG. 8). Arm 76 is pivotally secured to assembly 78 at 80 (FIG. 6A) and has an upstanding pin 82 that extends through bearing 84 on link 72. The outer end 86 of arm 76 is adapted to be connected to the swashplate 88 of pump 90 (FIG. 6A). The numeral 90A designates the servo piston for the pump, and the numeral 90B is a bearing for the swashplate 88.

The adjustment screw 78A (FIG. 8) is threaded into body 34 by threads 78B, and is connected by its opposite end to assembly 78.

Figure 10:
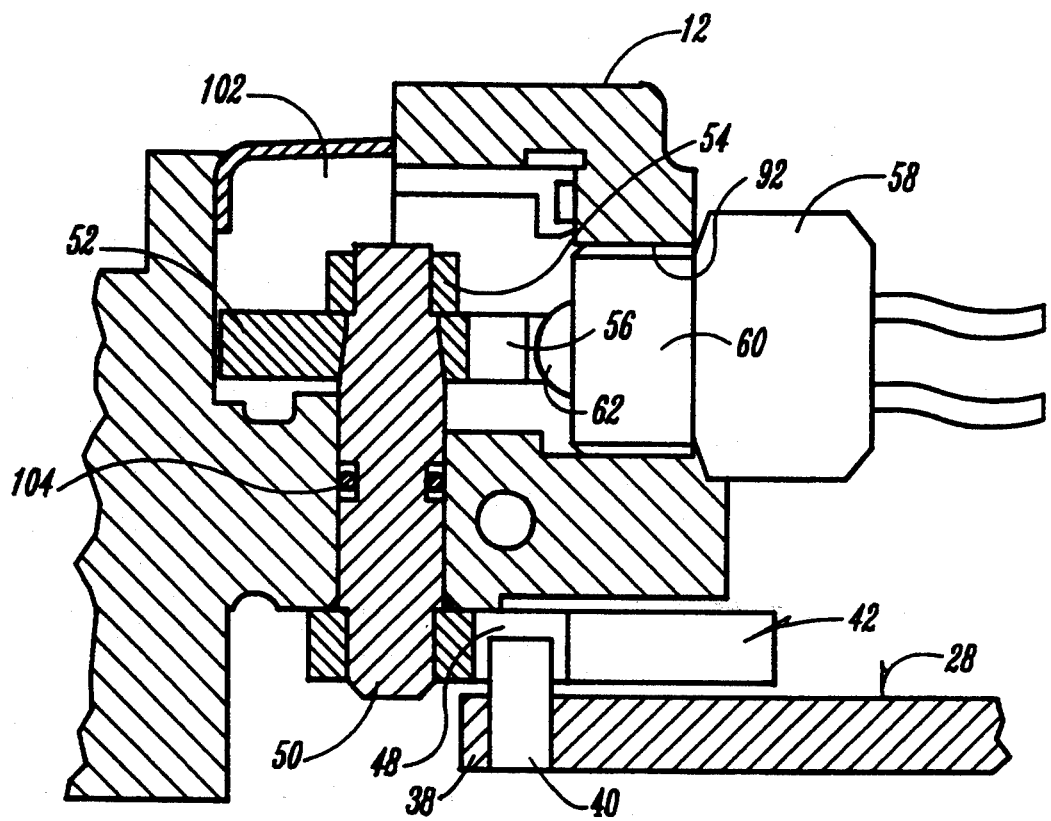
FIG. 10 is an enlarged scale sectional view taken on line 10—10 of FIG. 2.

With reference to FIG. 10, the switch 58 is threaded into bore 92 in cover member 12. Ball 62 extends into detent 56 of cam plate 52. Pin 40 is nestled in detent 48 and the switch rotor thereupon maintains cam plate 52 in spaced relation to the switch 58 so as to maintain the neutral position of the switch.

Figure 10A:
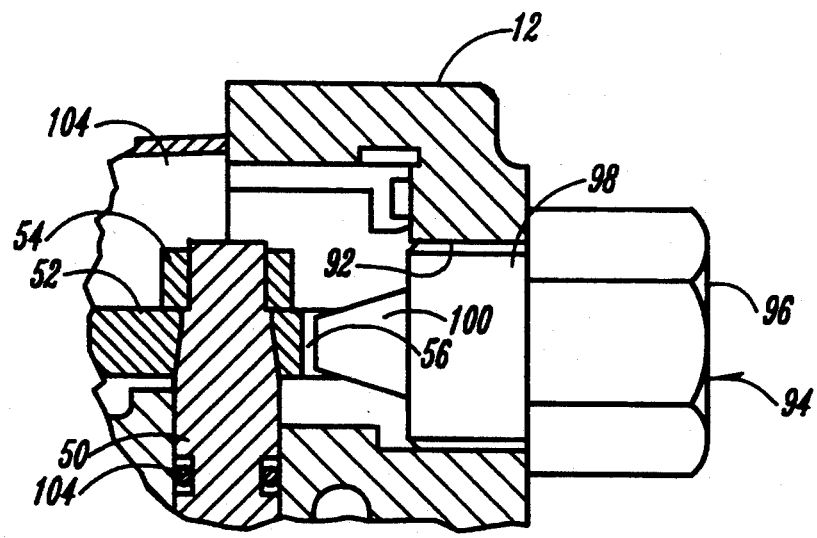
FIG. 10A is a view similar to that of FIG. 10 but with the backup alarm and neutral switch 58 removed and an installation tool inserted in place thereof.

In FIG. 10A, the switch 58 has been removed from port 92 and installation tool 94 has been inserted therein. Tool 94 has a nut configuration 96 on its outer end, a threaded body portion 98 at its center, and a cone shaped protrusion 100 on its inner end. As shown in FIG. 10A, member 100 protrudes into the detent 56 on cam plate 52 as will be more fully discussed hereafter.

The structure described above provides a means to incorporate a ball-actuated NSS and/or BAS for a manual displacement control while eliminating adjustments that are very difficult today in other devices.

Figure 2:
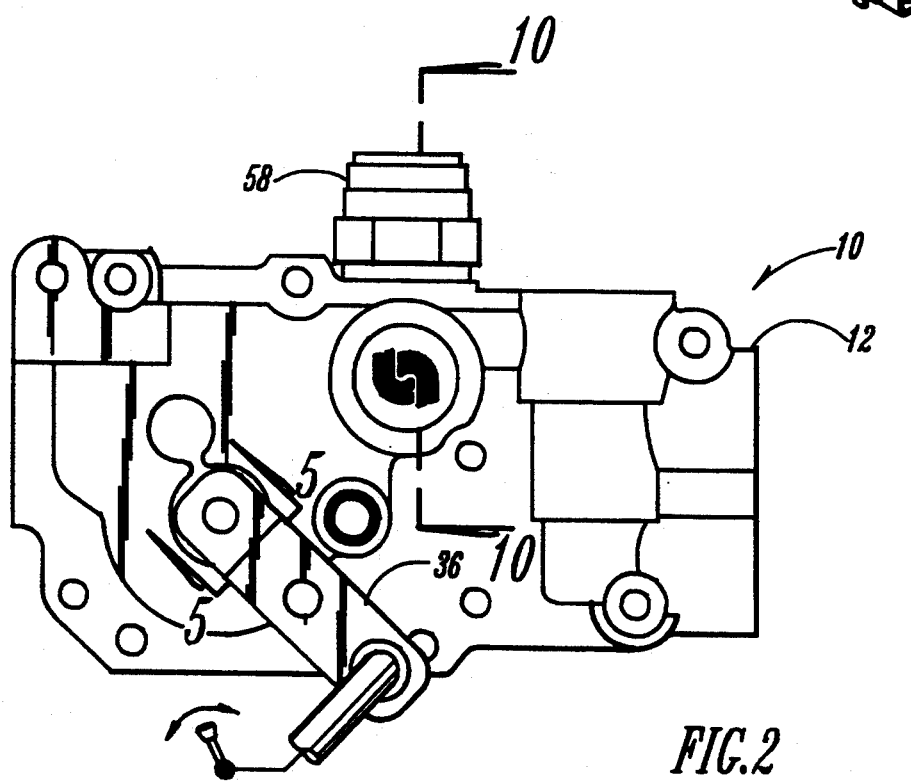
FIG. 2 is an enlarged scale top plan view thereof.

The electrical contacts of the NSS are closed when the input handle is in the centered position (FIG. 2). In this position, the NSS supplies vehicle battery voltage to the engine starting circuit, allowing the engine to be started. If the input handle 36 is rotated in either direction more than one to three degrees (see FIG. 2) the NSS breaks electrical contact, preventing engine starting when the input handle is out of its neutral position.

The BAS provides a different function in that the BAS is open in neutral and forward, but closes when the input handle is rotated in the reverse direction, thus energizing a backup alarm.

FIG. 7 shows the contact ball 62 of switch 58 in the neutral position. In this position, the ball 62 is fully extended from switch body 60 due to the position of the detent 56 in cam plate 52.

Figure 7A:
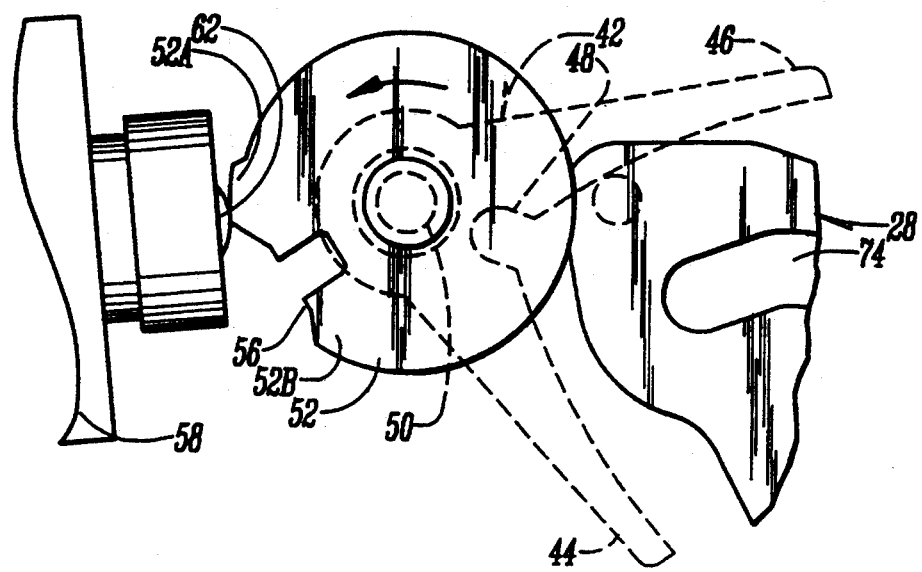
FIGS. 7A and 7B are a plan view similar to that of FIG. 7 but shows the cam plate and switch rotor in alternate positions to actuate the electrical switch.

FIG. 7A shows the switch ball fully depressed by cam shoulder 52A by rotation of the cam plate 52, which causes the NSS contacts to be open and the BAS contacts to be closed. If the cam plate 52 were rotated in the other direction, by forward rotation of the input handle 36, the switch ball 62 would be depressed to an intermediate position, by cam surface 52B (having a smaller diameter than cam shoulder 52A) causing the NSS to open without closing the BAS.

Figure 7B:
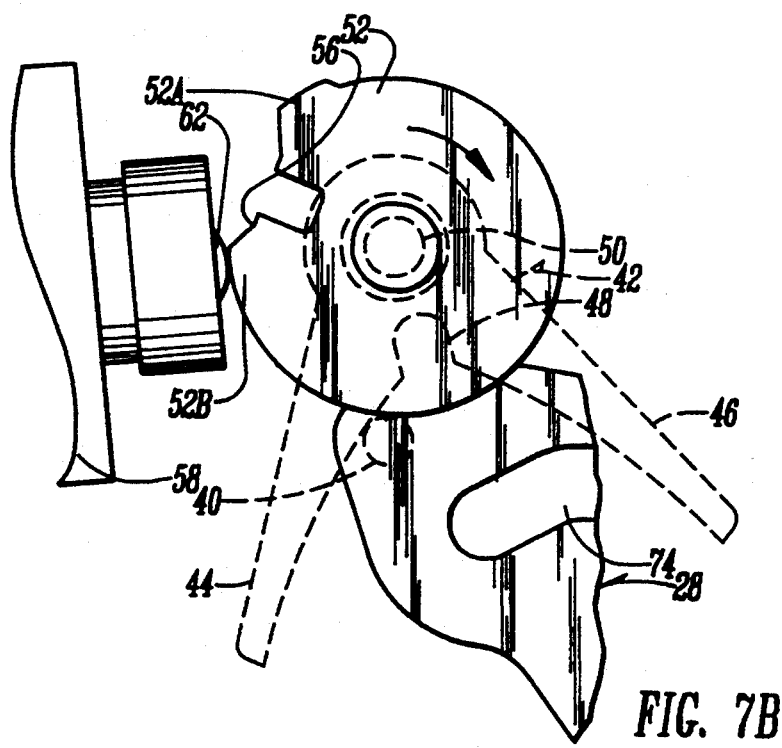

Switch 58 has three different operating positions depending upon the degree to which ball 62 is depressed. In other words, the operating positions relate to the degree of engagement that cam plate 52 has with ball 62. The first position is when the NSS is closed in the neutral position (FIG. 7). Ball 62 is either not engaged at all by cam plate 52, or only minimally depressed by the sides of detent 56. The second position is reached when cam plate 52 is rotated in either direction such that cam shoulder 52A or cam surface 52B sufficiently depresses ball 62 so as to open the NSS. (FIG. 7B) From the upper portion of FIG. 7B, it should be understood that switch ball 62 can also reach its second position during its engagement with the side of detent 56 adjacent to cam shoulder 52A. When ball 62 is depressed by the above-mentioned side of detent 56 such that the ball is at least as far from shaft 50 as surface 52B, the NSS will be opened. The third position is when cam shoulder 52A has been rotated into engagement with ball 62 to fully depress the ball and thus close the BAS circuit. (FIG. 7A)

Pin 40 drives switch rotor 42. As the input shaft 26 rotates from neutral, pin 40 rotates the switch rotor 42. Switch 58 is preferably threaded into a port in body member 12 with the ball 62 protruding into the detent 56 of the cam plate 52 (FIG. 10).

The torsion spring 20, shaft 26, plate 28 and switch rotor 42 are first installed in the body member 12. The centering action of the torsion spring 20 defines the neutral position of the shaft 26 and the switch rotor 42.

Before tightening the jam nut 54 (FIG. 10 and FIG. 10A), the installation tool 94 is installed into the switch port 92 to align the detent 56 of cam plate 52 with the switch port. With the switch rotor 42 held in the neutral position by the torsion spring 20, and the cam plate 52 held in the neutral position with the cone end 100 of tool 94 extending into the detent 56, the nut 54 is tightened. After the nut is tightened, the installation tool 94 is removed and the switch 58 is reinstalled within port 92.

This assembly procedure eliminates difficult adjustments that prior art devices require. The switch 58 can also be replaced with another switch without requiring readjustment. The entire control assembly 10 can be removed from the pump and replaced and the switch does not need to be reset.

This is possible because the input shaft 26 is spring centered relatively to the body member 12, thus its center position does not change with installation on a pump device. With prior art devices, the centered position of the handle 36 and shaft 26 is not determined until the control assembly is installed onto the pump, which requires that the switch mechanism be adjusted on the pump.

Another benefit of this invention is the isolation of forces caused by the pump case pressure from acting on the switch. With reference to FIG. 10, cavity 102 is a dry cavity, and O-ring 104 extending around shaft 50 seals the dry cavity and isolates this cavity from case hydraulic pressure as the cam rotates. Pump case pressure can push upwardly on the end of shaft 50, but the load is counteracted by the body member 12. This invention totally eliminates the potential of high case hydraulic pressure actuating the switch. With the elimination of the need to prevent switch actuation due to case pressure, the spring force in the switch can be reduced from 3-4 pounds required on prior art devices to 0.6 pounds in the instant invention. This lower force minimizes the additional force on handle 36 to lift the ball 62 out of detent 56. Thus, the user will not be forced to accept a noticeable "stick/slip" feel when moving the handle 36 away from its neutral position, which is a common problem with prior art devices. Handle stroking will be uniform and predictable through the entire range of motion.

From the foregoing, it is seen that the use of installation tool 94 eliminates the difficult adjustments which otherwise might be required during production or field service. This invention provides the ability to remove the control from the pump without having to readjust the neutral start switch assembly. This invention provides the ability to replace a switch and not have to readjust the neutral switch assembly, because there are no adjustments required on the switch. Further, this invention eliminates the possibility of case pressure from activating the electrical switch. Lastly, this invention permits actuation of a combination NSS/BAS switch with a single cam.

It is therefore seen that this invention will achieve at least all of its stated objectives.

We claim:

1. A manual control for controlling the fluid displacement of a variable displacement unit in a hydrostatic transmission, comprising, a body member having a first cavity exposed to hydraulic pressure from the variable displacement unit, a second cavity having a passage intersecting said first cavity, and sealing means operably positioned in said passage such that said second cavity is free of said hydraulic pressure, a manually operated input shaft extending into said first cavity, an electrical switch on said body member extending into said second cavity and having an actuating member capable of electrically and individually actuating at least one electrical circuit, a cam means having a cam plate thereon operatively connected to said input shaft and in contact with said electrical switch whereupon a first increment of movement of said cam means by said input shaft defines a first electrical mode;

and a second increment of movement of said cam means by said input shaft will define a second electrical mode.

2. The device of claim 1 wherein yieldable retention means is secured to said body member and said input shaft to normally maintain said switch in a neutral position wherein the neutral position of said switch is independent of said yieldable retention means whereby said switch and said yieldable retention means can be separated from each other for purposes of replacement or repair without affecting the normal neutral position of the other.

3. The device of claim 1 wherein said switch is normally in a closed and neutral position to define said first electrical mode, and is opened by said first increment of movement.

4. The device of claim 1 wherein said switch is normally open in a neutral position and is closed by said first increment of movement.

5. The device of claim 1 wherein said cam means and said switch are mounted in said body member and detachably secured to a pump body member, whereupon said body member can be removed from said pump body member without affecting the neutral position of said switch.

6. A method of adjusting for neutral on a manual control for controlling the fluid displacement of a variable displacement unit in a hydrostatic transmission, the control having a body member and a cam means releasably and operatively interconnecting an input shaft extending into the body member for rotation with the input shaft and selectively interconnecting the input shaft and an electrical switch mounted on the body member, the method comprising:

providing yieldable retention means interconnecting said body member and said input shaft to normally maintain said switch in a neutral position;

releasing said cam means from operative interconnection between said input shaft and said switch;

adjusting the position of said cam means with respect to said switch so that said cam means will maintain a generally symmetrical deadband for said switch in said neutral position; and then fixing the position of said cam means with respect to said input shaft and said switch.

7. A method of adjusting for neutral on a manual control for controlling the fluid displacement of a variable displacement unit in a hydrostatic transmission, the control having a body member and a cam means having a cam plate releasably and operatively interconnecting an input shaft extending into the body member for rotation with the input shaft and selectively interconnecting the input shaft and an electrical switch mounted on the body member, the method comprising:

providing yieldable retention means interconnecting said body member and said input shaft to normally maintain said switch in a neutral position;

releasing said cam plate from operative interconnection between said input shaft and said switch;

adjusting the position of said cam plate with respect to said switch and said input shaft so that said cam plate will maintain a generally symmetrical deadband for said switch in said neutral position; and then fixing the position of said cam plate with respect to said input shaft and switch.

8. A manual control for controlling the fluid displacement of a variable displacement unit in a hydrostatic transmission, comprising:

a body member having a first cavity exposed to hydraulic pressure from the variable displacement unit, a second cavity having a passage intersecting said first cavity, and sealing means operably positioned in said passage such that said second cavity is free of said hydraulic pressure;

a manually operated input shaft extending into said first cavity;

an electrical switch mounted on said body member and extending into said second cavity and having an actuating member capable of electrically and individually actuating at least two separate electrical circuits;

cam means operatively connected to said input shaft and positioned to operatively contact said electrical switch such that a first increment of movement of said cam means by said input shaft will open one of said circuits, and a second increment of movement of said cam means will close the other of said circuits; and said switch means being normally in a closed and neutral position.

9. The device of claim 8 wherein one of said circuits is a vehicle motor starting circuit, and the other of said circuits is a vehicle backup alarm circuit.

10. The device of claim 8 wherein said electrical switch is a three position spring actuated switch.

11. The device of claim 8 wherein said cam means includes a cam plate located in said second cavity and having a detent portion normally positioned opposite said switch in said neutral position and adapted upon movement to engage said switch to cause said switch to close one circuit and to open said other circuit.

12. The device of claim 11 wherein a switch rotor has an end secured to said cam plate and an opposite end operatively secured to said input shaft by linkage means whereupon rotation of said input shaft will rotate said switch rotor, said switch rotor having two angularly extending cam arms with a detent therebetween, said linkage means having a pin engaging said detent on said switch rotor to yieldably hold said cam plate in said normal position with respect to said switch means to maintain said switch means in said neutral and closed position, with rotation of said input shaft causing said pin on said linkage means to move out of said detent on said switch rotor and into engagement with one of said cam arms to rotate said switch rotor and said cam plate into operative engagement with said switch means.

13. The device of claim 12 wherein said switch rotor end secured to said cam plate is tapered for ensuring that said cam plate is positioned with respect to said switch.

14. The device of claim 11 wherein torsional spring means is secured to said body member and said input shaft to normally maintain said variable displacement unit in a neutral position wherein zero fluid displacement is generated and wherein said cam plate is detachable from said torsional spring means and independently position-adjustable with respect to said switch and said torsional spring means whereby said switch and said cam means can be separated from each other for purposes of replacement or repair without affecting the normal neutral position of the other.

15. The device of claim 8 wherein said cam means and said switch are mounted in said body member and detachably secured to a pump body member, whereupon said body member can be removed from said pump body member without affecting the neutral position of said switch.

16. The device of claim 8 wherein said cam means includes a lost motion slot therein operatively engaged with a feedback linkage means extending into said first cavity from said variable displacement unit.

17. A manual control for controlling the fluid displacement of a variable displacement unit in a hydrostatic transmission, comprising:

a body member having a first cavity exposed to hydraulic pressure from the variable displacement unit, a second cavity having a passage intersecting said first cavity, and sealing means operably positioned in said passage such that said second cavity is free of said hydraulic pressure;

a manually operated input shaft extending into said first cavity;

an electrical switch mounted on said body member and extending into said second cavity and having an actuating member capable of electrically and individually actuating at least two separate electrical circuits;

cam means operatively connected to said input shaft and positioned to operatively contact said electrical switch such that a first increment of movement of said cam means by said input shaft will open one of said circuits, and a second increment of movement of said cam means will close the other of said circuits;

said switch means being normally in a closed and neutral position; and torsional spring means operably secured to said body member and said input shaft to normally maintain said switch in said neutral position wherein one circuit is closed and the other circuit is open.

18. The device of claim 17 wherein linkage means connects said input shaft and said cam means, and said torsional spring means maintains said input shaft, said linkage means and said cam means in a configuration with respect to said switch to normally maintain said switch in said neutral position wherein one circuit is closed and the other circuit is open.

* * * * *